United States Patent [19]

Ide et al.

[11] Patent Number: 5,314,173
[45] Date of Patent: May 24, 1994

[54] FLUID-FILLED ELASTIC MOUNT HAVING VACUUM-RECEIVING CHAMBER PARTIALLY DEFINED BY ELASTIC MEMBER FOR ISOLATING HIGH-FREQUENCY VIBRATIONS

[75] Inventors: Akiyoshi Ide, Inuyama; Atsushi Muramatsu, Komaki, both of Japan

[73] Assignee: Tokai Rubber Industries, Ltd., Japan

[21] Appl. No.: 842,991

[22] Filed: Feb. 28, 1992

[30] Foreign Application Priority Data

Mar. 4, 1991 [JP] Japan .................. 3-062662

[51] Int. Cl.⁵ .................. F16F 13/00; F16F 9/08
[52] U.S. Cl. .................. 267/140.14; 248/562
[58] Field of Search .......... 267/140.14, 219, 140.13; 248/562, 566, 636; 180/312, 300, 902

[56] References Cited

U.S. PATENT DOCUMENTS

| 4,657,232 | 4/1987 | West | 267/219 X |
| 4,720,087 | 1/1988 | Duclos et al. | 267/140.14 |
| 4,861,006 | 8/1989 | Takano et al. | 267/140.14 |
| 5,098,072 | 3/1992 | Muramatsu et al. | 267/219 X |
| 5,145,156 | 9/1992 | Muramatsu et al. | 248/562 X |
| 5,180,148 | 1/1993 | Muromatsu | 267/140.14 |

FOREIGN PATENT DOCUMENTS

| 3801108 | 7/1989 | Fed. Rep. of Germany | 180/312 |
| 57-9340 | 1/1982 | Japan |  |
| 58-29517 | 2/1983 | Japan |  |
| 3125045 | 5/1991 | Japan | 180/312 |

Primary Examiner—Robert J. Oberleitner
Assistant Examiner—Josie A. Ballato
Attorney, Agent, or Firm—Parkhurst, Wendel & Rossi

[57] ABSTRACT

A fluid-filled elastic mount including first and second support members and an elastic body interposed between these members for elastic connection thereof. The elastic mount has a pressure-receiving chamber partially defined by the elastic body, first and second equilibrium chambers defined by first and second flexible diaphragms and communicating with the pressure-receiving chamber through first and second orifice passages, respectively. The second orifice passage has a higher ratio of the cross sectional area to the length than the first orifice passage. The present elastic mount further includes an elastic restriction member which is opposed to the second diaphragm and cooperates with the diaphragm to define a vacuum-receiving chamber for allowing elastic deformation of the second diaphragm. In operation, a vacuum pressure is applied where appropriate to the vacuum-receiving chamber, to draw the second diaphragm onto the elastic restriction member, so as to restrict free deformation of the second diaphragm and permit oscillation of the diaphragm with the elastic restriction member.

9 Claims, 2 Drawing Sheets

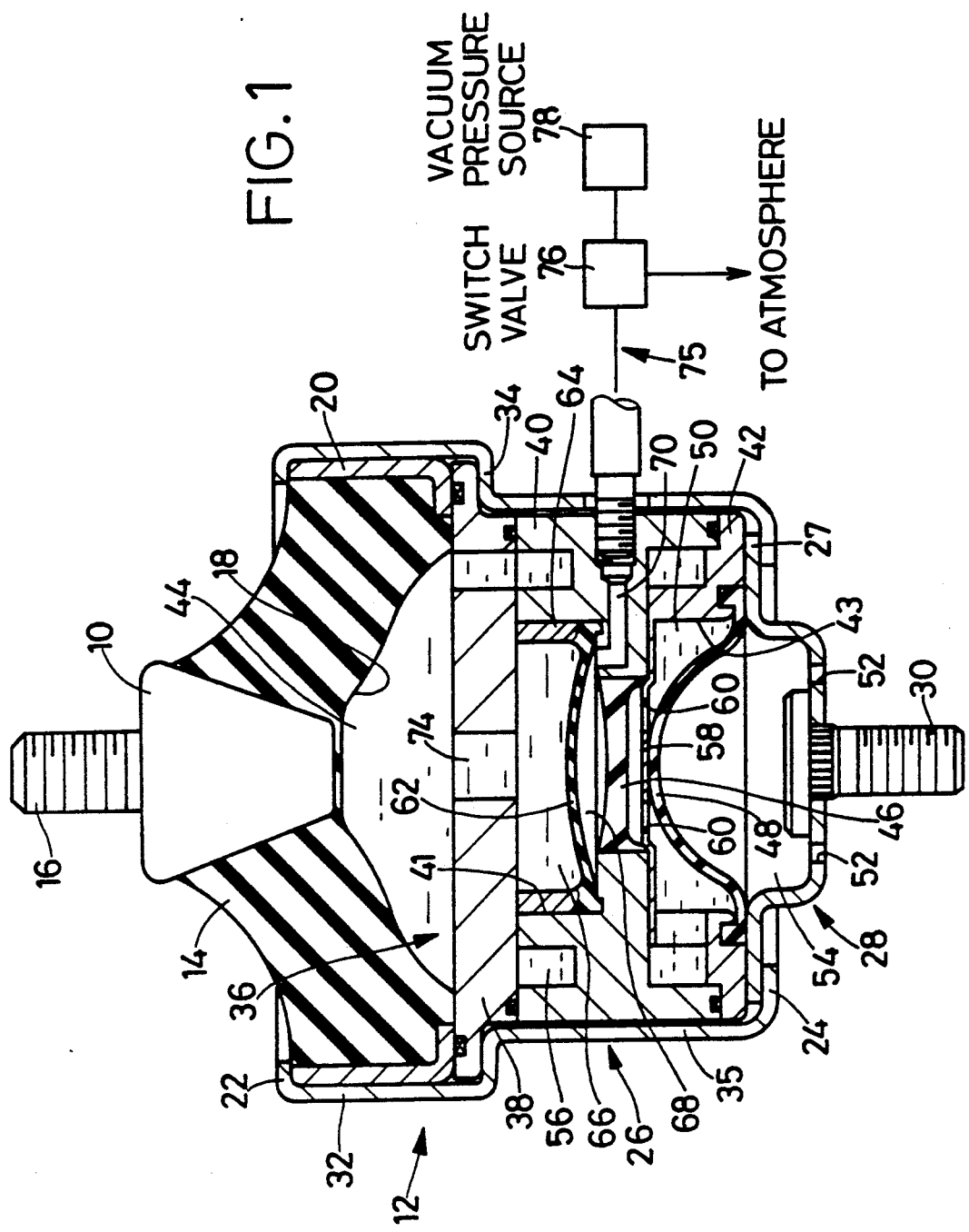

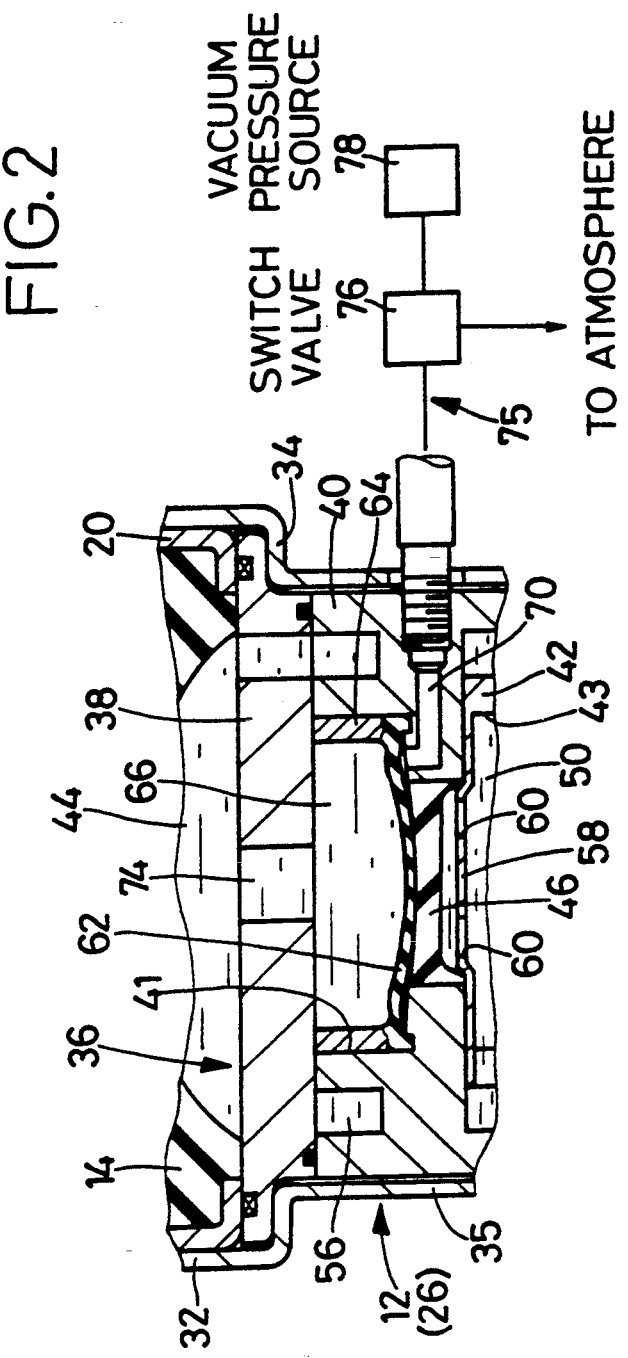

FLUID-FILLED ELASTIC MOUNT HAVING VACUUM-RECEIVING CHAMBER PARTIALLY DEFINED BY ELASTIC MEMBER FOR ISOLATING HIGH-FREQUENCY VIBRATIONS

BACKGROUND OF THE INVENTION

1. Field of the Invention

The present invention relates in general to a fluid-filled elastic mount for damping or isolating vibrations based on flow of a fluid contained therein. More particularly, the present invention is concerned with such a fluid-filled elastic mount which is capable of exhibiting different vibration damping or isolating characteristics depending upon the type of the vibrations applied thereto, assuring an excellent damping or isolating effect for a wide frequency range of input vibrations.

2. Discussion of the Prior Art

As one type of vibration damping devices such as an engine mount for a motor vehicle, there is known a so-called fluid-filled elastic mount which includes a first and a second support structure that are spaced apart from each other and elastically connected to each other by an elastic body interposed therebetween. The fluid-filled elastic mount has a pressure-receiving chamber and a variable-volume equilibrium chamber which are filled with a suitable non-compressible fluid, and an orifice passage which permits flow of the fluid therethrough between the two fluid chambers. The pressure-receiving chamber is partially defined by the elastic body, and a pressure of the fluid in this chamber changes upon application of vibrations. The equilibrium chamber is partially defined by a flexible diaphragm which is elastically deformable to accommodate a volumetric change of this chamber. The fluid-filled elastic mount of the above type damps the input vibrations, based on resonance of a mass of the fluid flowing through the orifice passage, more effectively than an elastic mount which relies only upon the elasticity of the elastic body for damping the vibrations.

Generally, the elastic mount is required to exhibit different vibration damping or isolating characteristics depending upon the type of the vibrations applied thereto. For example, the elastic mount when used as a vehicle engine mount is required to exhibit high damping capability with respect to low-frequency large-amplitude vibrations, such as engine shake and bounce, and to provide a sufficiently reduced dynamic spring constant with respect to middle-frequency vibrations such as engine idling vibrations and high-frequency small-amplitude vibrations such as booming noise.

However, the fluid-filled elastic mount constructed as described above can provide a sufficiently high damping effect based on the resonance of the fluid mass in the orifice passage, only with respect to the vibrations whose frequencies are in the neighborhood of the frequency to which the orifice passage is tuned. Therefore, it has been extremely difficult for the known elastic mount to effectively damp or isolate two or more types of vibrations or a wide frequency range of vibrations.

To achieve a high damping effect for low-frequency vibrations and a sufficiently low dynamic spring constant for middle-frequency vibrations, there has been proposed a mounting device as disclosed in laid-open Publication No. 58-29517 of unexamined Japanese Utility Model Application, which has first and second orifice passages formed in parallel with each other between the pressure-receiving and equilibrium chambers The first orifice passage is tuned so that the mount can effectively damp the low-frequency vibrations such as engine shake, while the second orifice passage is tuned so that the mount provides a relatively low dynamic spring constant for the middle-frequency vibrations such as engine idling vibrations. The proposed mounting device further has a valve system for selectively opening the first or second orifice passage so that the fluid is forced to flow through the selected orifice passage. To achieve a sufficiently low dynamic spring constant for high-frequency vibrations, on the other hand, there has been proposed a mounting device as disclosed in laid-open Publication No. 57-9340 of unexamined Japanese Patent Application, which has a movable member disposed between the pressure-receiving and equilibrium chambers. This movable member is displaceable or deformable over a given distance, and is adapted to absorb a pressure change of the pressure-receiving chamber upon application of high-frequency vibrations such as booming noise.

In the mounting device having the two orifice passages for damping and isolating low- and middle-frequency vibrations as disclosed in the publication No. 58-29517, it is necessary to incorporate in the structure of the device valve means for selectively opening the orifice passages, and biasing or drive means for actuating the valve means. Accordingly, it is difficult for this mounting device to have enough space for provision of the movable member as disclosed in the publication No. 57-9340, for assuring a relatively low dynamic spring constant with respect to high-frequency vibrations. Even if the movable member is disposed in a limited space in the mounting device, the mounting device cannot provide a sufficiently high vibration isolating effect due to insufficiency of the cross sectional area and the distance of displacement of the movable member.

If the movable member is designed to have an increased cross sectional area and an increased distance of the displacement thereof, to assure a significantly reduced dynamic spring constant for the high-frequency vibrations, the mounting device tends to be large-sized, and suffers from deterioration in the vibration damping or isolating effects based on flow of the fluid through the orifice passages. Namely, even when the mounting device receives the low- and middle-frequency vibrations which should be damped or isolated by the orifice passages, the pressure changes in the pressure-receiving chamber are more or less absorbed by the movable member, whereby the amounts of the fluid flowing through the orifice passages are accordingly reduced. Consequently, the orifice passages are unable to provide a sufficiently high vibration damping or isolating effect. Particularly, upon application of middle-frequency vibrations, such as relatively small-amplitude engine idling vibrations, the mounting device seriously suffers from deterioration of its vibration isolating capability based on the fluid flow through the relevant orifice passage, since pressure changes in the pressure-receiving chamber are largely absorbed by the movable member.

For the reasons as described above, the known elastic mounts cannot provide sufficient vibration damping and isolating effects for a wide frequency range of input vibrations, leaving some room for improvement.

SUMMARY OF THE INVENTION

It is therefore an object of the present invention to provide a fluid-filled elastic mount which is compact in size and simple in construction, and which is capable of providing a high damping effect for low-frequency vibrations while exhibiting a significantly reduced dynamic spring constant for middle- and high-frequency vibrations.

The above object may be achieved according to the principle of the present invention, which provides a fluid-filled elastic mount for flexibly connecting two members, comprising: (a) a first support member and a second support member which are respectively fixed to the two members to be flexibly connected, and which are spaced apart from each other in a load-receiving direction in which vibrations are applied to the elastic mount; (b) an elastic body interposed between the first and second support members for elastically connecting the first and second support members; (c) the elastic body at least partially defining a pressure-receiving chamber which is filled with a non-compressible fluid, a pressure of the fluid in the pressure-receiving chamber changing due to elastic deformation of the elastic body upon application of the vibrations in the load-receiving direction; (d) a first flexible diaphragm partially defining a first equilibrium chamber filled with the non-compressible fluid, the first flexible diaphragm being elastically deformable so as to permit a volumetric change of the first equilibrium chamber to absorb a pressure change of the fluid in the first equilibrium chamber; (e) means for defining a first orifice passage which communicates with the pressure-receiving chamber and the first equilibrium chamber so as to permit flow of the fluid therebetween; (f) a second flexible diaphragm partially defining a second equilibrium chamber filled with the non-compressible fluid, the second flexible diaphragm being elastically deformable so as to permit a volumetric change of the second equilibrium chamber to absorb a pressure change of the fluid in the second equilibrium chamber; (g) means for defining a second orifice passage which communicates with the pressure-receiving chamber and the second equilibrium chamber so as to permit flow of the fluid therebetween, the second orifice passage having a ratio of a cross sectional area thereof to a length thereof, which ratio is higher than that of the first orifice passage; (h) an elastic restriction member which is disposed opposite the second flexible diaphragm and cooperates with the second flexible diaphragm to at least partially define a vacuum-receiving chamber, such that the second equilibrium chamber is separated from the vacuum-receiving chamber by the second flexible diaphragm, the vacuum-receiving chamber permitting elastic deformation of the second flexible diaphragm; and (i) pressure control means for applying a vacuum pressure to the vacuum-receiving chamber to draw the second flexible diaphragm onto the elastic restriction member, so as to restrict free deformation of the second flexible diaphragm and permit oscillation of the second flexible diaphragm with the elastic restriction member.

The fluid-filled elastic mount constructed as described above exhibits different vibration damping or isolating characteristics depending upon the type of the vibrations applied thereto, by appropriately applying the vacuum pressure to the vacuum-receiving chamber. That is, the present elastic mount effectively damps low-frequency vibrations based on flow of the fluid through the first orifice passage, and provides a significantly reduced dynamic spring constant to isolate middle-frequency vibrations based on flow of the fluid through the second orifice passage, and high-frequency vibrations based on the displacement or deformation of the elastic restriction member.

Further, the present fluid-filled elastic mount does not need to incorporate in its structure a switch valve for selectively opening or closing orifice passages and drive means for actuating the switch valve. Therefore, the elastic mount capable of exhibiting excellent vibration damping/isolating capability can be simple in construction and compact in size.

In the fluid-filled elastic mount of the present invention, pressure changes in the pressure-receiving chamber are absorbed by the elastic restriction member only when the vacuum-receiving chamber is evacuated by the pressure control means. Accordingly, the elastic mount can effectively isolate the middle-frequency vibrations based on the fluid flow through the second orifice passage, without suffering from the pressure absorbing function of the elastic restriction member, when the vacuum-receiving chamber having a given volume appears behind the second flexible diaphragm which partially defines the second equilibrium chamber.

BRIEF DESCRIPTION OF THE DRAWINGS

The above and optional objects, features and advantages of the present invention will be better understood by reading the following detailed description of a presently preferred embodiment of the invention, when considered in connection with the accompanying drawings, in which:

FIG. 1 is an elevational view in axial cross section of one embodiment of a fluid-filled elastic mount of the present invention in the form of an engine mount for a motor vehicle; and FIG. 2 is a fragmentary axial cross sectional view of the fluid-filled elastic mount of FIG. 1 when a vacuum-receiving chamber of the mount is subjected to a vacuum pressure.

DETAILED DESCRIPTION OF THE PREFERRED EMBODIMENTS

Referring first to FIG. 1 showing the vehicle engine mount as one embodiment of the fluid-filled elastic mount of this invention, reference numerals 10 and 12 denote a first and a second rigid support member, respectively. These first and second support members 10, 12 are opposed to each other and spaced apart from each other by a suitable distance, in a load-receiving direction in which vibrations are received by the engine mount. Between the first and second support members 10, 12, there is formed an elastic body 14 such that the two members 10, 12 are elastically connected to each other by the elastic body 14. The instant engine mount is installed on a motor vehicle such that the first support member 10 is fixed to an engine unit including the engine of the vehicle, while the second support member 12 is fixed to the body of the vehicle. Thus, the engine unit is flexibly mounted on the vehicle body in a vibration damping or isolating manner. With the engine mount installed in position on the vehicle as described above, the weight of the engine unit acts on the mount in the direction (vertical direction as viewed in FIG. 1) in which the first and second support members 10, 12 are opposed to each other, whereby the elastic body 14 is elastically deformed or contracted so that the two support members 10, 12 are moved toward each other from their pre-installation positions by a suitable distance in the above-indicated direction. The instant engine mount is adapted to damp or isolate the input vibrations which are applied primarily in the direction in which the first and second support members 10, 12 are opposed to each other, that is, the above-indicated load-receiving direction.

More specifically, the first support member 10 is a metallic member having a generally truncated conical shape. A mounting bolt 16 is formed integrally with the first support member 10 such that the bolt 16 protrudes in the load-receiving direction from a central portion of the large-diameter end face of the support member 10, axially outwardly of the engine mount. The engine mount is fixed to the vehicle engine unit through the mounting bolt 16.

The above-indicated elastic body 14 is secured by vulcanization to the first support member 10. This elastic body 14 has a generally truncated conical shape, and is formed with a cavity 18 which is open in its large-diameter end face on the side of the second support member 12. The first support member 10 is bonded by vulcanization to the small-diameter end face of the elastic body 14, while a cylindrical metallic connecting member 20 is bonded by vulcanization to the outer circumferential surface of a large-diameter end portion of the elastic body 14. Thus, the first support member 10, elastic body 14 and connecting member 20 are formed into an integral unit, by means of vulcanization of a suitable rubber material for the elastic body 14.

The second support member 12 consists of a generally cylindrical member 26 with an axially intermediate shoulder portion 34, and a dish-like bottom member 28 having an outward flange 27 formed at the periphery of the opening thereof. The cylindrical member 26 includes a large-diameter portion 32, a small-diameter portion 35 and the shoulder portion 34 disposed therebetween. The cylindrical member 26 further has an annular projection 24 formed at the open end of the small-diameter portion 35, and a caulked portion 22 formed at the open end of the large-diameter portion 32. The cylindrical member 26 and bottom member 28 are assembled together such that the outward flange 27 of the bottom member 28 is superposed on and supported by the inner surface of the annular projection 24 of the cylindrical member 26. A mounting bolt 30 is formed on the second support member 12 so as to protrude in the load-receiving direction from a central portion of the bottom member 28, axially outwardly of the engine mount. The engine mount is fixed to the vehicle body through the mounting bolt 30.

The above-indicated connecting member 20 secured to the outer surface of the elastic body 14 is fitted in the large-diameter portion 32 of the cylindrical member 26 of the second support member 12, and axially gripped between the shoulder portion 34 and caulked portion 22 of the cylindrical member 26. In this manner, the second support member 12 is assembled with the integral unit of the first support member 10, elastic body 14 and connecting member 20. Thus, the first and second support members 10, 12 are opposed to each other in the load-receiving direction (vertical direction as viewed in FIG. 1) with a suitable spacing therebetween, with the elastic body 14 interposed between these two support members 10, 12 for flexible connection therebetween.

Within the small-diameter portion 35 of the cylindrical member 26 of the second support member 12, there is accommodated a thick-walled, generally circular partition structure 36 which extends in a direction substantially perpendicular to the load-receiving direction. The partition structure 36 consists of a disc-like upper partition member 38, a generally cylindrical middle partition member 40 and a generally annular lower partition member 42. These three partition members 38, 40, 42 are coaxially superposed on each other in the axial direction of the engine mount, and are fixedly attached to the second support member 12. Between the mating surfaces of the partition members 38, 40 and 42 and between the abutting faces of the upper partition member 38 and the connecting member 20, there are provided suitable O rings for ensuring fluid-tightness between these members 38, 40, 42 and 20.

Between the first support member 10 and the upper partition member 38 of the partition structure 36, there is formed a pressure-receiving chamber 44 which is partially defined by the elastic body 14. The pressure-receiving chamber 44 is filled with a suitable non-compressible fluid, such as water, alkylene glycol, polyalkylene glycol and silicone oil. When a vibrational load is applied between the first and second support members 10, 12, a pressure of the fluid in the pressure-receiving chamber 44 changes as a result of a volumetric change of the same chamber 44 due to elastic deformation of the elastic body 14.

Between the upper partition member 38 and the bottom member 28, on the other hand, there is formed an enclosed space which substantially consists of an inner bore 41 of the middle partition member 40 and an inner bore 43 of the lower partition member 42. At an axially intermediate portion of the enclosed space, there is provided an elastic restriction plate 46 in the form of a disc-like rubber membrane having a suitable thickness. The elastic restriction plate 46 is bonded at its periphery to the inner circumferential surface of the middle partition member 40 by means of vulcanization. Thus, the elastic restriction plate 46 is adapted to fluid-tightly divide the space between the upper partition member 38 and the bottom member 28, into a first section on the side of the bottom member 28 and a second section on the side of the upper partition member 38.

The lower partition member 42 is formed integrally with a rigid stopper plate 58, which is located below the elastic restriction plate 46 with a suitable spacing therebetween. This stopper plate 58 serves to avoid excessive elastic deformation of the elastic restriction plate 46 by abutting contact therebetween. The stopper plate 58 has a plurality of through-holes 60 which allow free flow of the fluid therethrough.

In the above-indicated first section of the space, i.e., between the elastic restriction plate 46 and the bottom member 28, there is provided a first flexible diaphragm 48 such that its peripheral portion is fluid-tightly gripped by and between the lower partition member 42 and the bottom member 28. The first diaphragm 48 is adapted to divide the first section into a first variable-volume equilibrium chamber 50 and an air chamber 54. The first equilibrium chamber 50, which is formed between the first diaphragm 48 and the elastic restriction plate 46, is filled with the non-compressible fluid as described above. The equilibrium chamber 50 will not undergo pressure changes upon application of vibrations to the engine mount, since the pressure changes are absorbed by volumetric changes of the chamber 50 due to elastic deformation of the first diaphragm 48. The air chamber 54, which is formed between the first diaphragm 48 and the bottom member 28, communicates with the atmosphere through-holes 52 formed through the bottom member 28, and is adapted to allow the elastic deformation of the first diaphragm 48.

The partition structure 36 has a first orifice passage 56 formed in the circumferential direction through radially outer portions of the upper, middle and lower partition members 38, 40, 42, over a given circumferential length which is longer than one round. This first orifice passage 56 communicates at one of opposite ends with the pressure-receiving chamber 44, and at the other end with the first equilibrium chamber 50, to thereby allow flow of the fluid therethrough between these two chambers 44, 50.

In the above-indicated second section of the space, i.e., between the elastic restriction plate 46 and the upper partition member 38, there is provided a second flexible diaphragm 62 such that a retainer ring 64 secured by vulcanization to the peripheral portion of the diaphragm 62 is press-fitted into the inner bore 41 of the middle partition member 40. This second diaphragm 62 is adapted to fluid-tightly divide the second section into a second equilibrium chamber 66 and an air-tight vacuum-receiving chamber 68. The second equilibrium chamber 66, which is formed between the second diaphragm 62 and the upper partition member 38, is filled with the non-compressible fluid as described above. This second equilibrium chamber 66 will not undergo pressure changes upon application of vibrations to the engine mount, since the pressure changes are absorbed by volumetric changes of the chamber 66 due to elastic deformation of the diaphragm 62. The vacuum-receiving chamber 68, which is formed between the second diaphragm 62 and the elastic restriction plate 46, is adapted to allow the elastic deformation of the second diaphragm 62.

The vacuum-receiving chamber 68 is exposed to the exterior space, through an air passage 70 formed through the middle partition member 40, and is connected through the air passage 70 to pressure changing means (which will be described later) when the engine mount is installed in position on the vehicle.

The upper partition member 38 has a second orifice passage 74 formed at its central portion through the entire thickness thereof in the axial direction of the mount. This second orifice passage 74 communicates with the second equilibrium chamber 66 and the pressure-receiving chamber 44, to allow flow of the fluid therethrough between the two chambers 66, 44. The second orifice passage 74 has a larger cross sectional area and a smaller flow length than the first orifice passage 56. Namely, the ratio of the cross sectional area to the length of the second orifice passage 74 is larger than that of the first orifice passage 56. Accordingly, the resonance frequency of the fluid flowing through the second orifice passage 74 is set to be higher than that of the fluid flowing through the first orifice passage 56.

In the instant embodiment, the first orifice passage 56 is tuned so that the engine mount is able to effectively damp relatively low-frequency vibrations, such as engine shake or bounce, based on resonance of a mass of the fluid in the passage 56. On the other hand, the second orifice passage 74 is tuned so that the engine mount exhibits a sufficiently reduced dynamic spring constant with respect to middle-frequency vibrations, such as engine idling vibrations, based on the resonance of a mass of the fluid in the passage 74.

With the instant engine mount installed in position on the motor vehicle, the air passage 70 communicating with the vacuum-receiving chamber 68 is connected to a switch valve 76 through an air conduit 75. The switch valve 76 is selectively placed in a first position for exposing the vacuum-receiving chamber 68 to the atmosphere, and a second position for connecting the vacuum-receiving chamber 68 to a vacuum pressure source 78. The engine mount of the instant embodiment may favorably utilize an intake pressure in the intake pipe of the internal combustion engine as a vacuum pressure to be supplied by the vacuum pressure source 78.

It will be understood from the above description that the vibration damping or isolating characteristics of the instant engine mount can be changed by placing the switch valve 76 selectively in the first position in which the vacuum-receiving chamber 68 is exposed to the atmosphere, or the second position in which the vacuum-receiving chamber 68 is connected to the vacuum pressure source 78. Consequently, the engine mount provides a high damping effect for low-frequency large-amplitude vibrations such as engine shake or bounce, and exhibits sufficiently reduced dynamic spring constants for middle-frequency middle-amplitude vibrations such as engine idling vibrations, and for high-frequency small-amplitude vibrations such as booming noise.

More specifically described, when the engine mount receives middle-frequency idling vibrations while the vehicle is at a stop with the engine idling, the switch valve 76 is operated to the first position for exposing the vacuum-receiving chamber 68 to the atmosphere. In this case, the vacuum-receiving chamber 68 having a given volume lies behind the second diaphragm 62 as shown in FIG. 1, and is adapted t allow the elastic deformation of the second diaphragm 62 to thereby permit volumetric changes of the second equilibrium chamber 66. Consequently, effective flow of the fluid occurs between the pressure-receiving chamber 44 and the second equilibrium chamber 66 through the second orifice passage 74, based on alternate pressure changes arising in the pressure-receiving chamber 44. Thus, the engine mount exhibits a significantly lowered dynamic spring constant for effectively isolating the engine idling vibrations, based on the resonance of the fluid flowing through the second orifice passage 74.

In the condition described just above, the first orifice passage 56 is also held in fluid communication with the pressure-receiving and first equilibrium chambers 44, 50. However, the fluid is less likely to flow between these chambers 44, 50, due to relatively large resistance to the fluid flow through the first orifice passage 56 as compared with the second orifice passage 74. In substance, the middle-frequency idling vibrations cause the fluid to effectively flow only through the second orifice passage 74, between the pressure-receiving and second equilibrium chambers 44, 66. Accordingly, upon application of the engine idling vibrations to the mount, a sufficiently large amount of the fluid is forced to flow through the second orifice passage 74 even if the first orifice passage 56 communicates with the pressure-receiving and first equilibrium chamber 44, 50, thereby assuring a significantly improved vibration isolating effect for the engine idling vibrations.

While the vehicle is running, on the other hand, the engine mount receives high-frequency small-amplitude vibrations such as booming noise, as well as low-frequency large-amplitude vibrations such as engine shake or bounce. In this case, the switch valve 76 is operated to the second position for connecting the vacuum-receiving chamber 68 to the vacuum pressure source 78. As a result, the vacuum-receiving chamber 68 is evacuated so that the second diaphragm 62 is drawn onto the elastic restriction plate 46, whereby the volume of the vacuum-receiving chamber 68 is substantially zeroed, as shown in FIG. 2. In this condition, the elastic restriction plate 46 restricts or prevents free elastic deformation of the second diaphragm 62. Namely, the second diaphragm 62 is prevented from being freely deformed to accommodate volumetric changes of the second equilibrium chamber 66 so as to absorb pressure changes in the same chamber 66.

When the engine mount receives the low-frequency large-amplitude vibrations such as engine shake or bounce while the switch valve 76 is placed in the second position wherein substantial volumetric changes do not take place in the second equilibrium chamber 66, the fluid in the mount is forced to flow effectively between the pressure-receiving chamber 44 and the first equilibrium chamber 50 through the first orifice passage 56, due to alternate pressure changes in the pressure-receiving chamber 44. Thus, the engine mount provides a sufficiently high vibration damping effect for the low-frequency vibrations, based on the resonance of the fluid flowing through the first orifice passage 56.

In the above condition, the elastic deformation of the second diaphragm 62 is restricted by the elastic restriction plate 46, such that the diaphragm 62 is allowed to elastically deform to a small extent, that is, to oscillate with the elastic restriction plate 46. Thus, upon application of high-frequency small-amplitude vibrations such as booming noise, the instant engine mount can effectively absorb slight pressure changes arising in the pressure-receiving chamber 44, based on the elastic deformation of the second diaphragm 62 and elastic restriction plate 46, thereby alleviating or preventing undesirable pressure rise in the pressure-receiving chamber 44. Consequently, the dynamic spring constant of the engine mount is favorably maintained at a relatively low level, based on the pressure absorbing function of the second diaphragm 62 and elastic restriction plate 46, whereby the engine mount provides an excellent isolating effect for the high-frequency vibrations.

It follows from the above description that the engine mount constructed as described above exhibits desired vibration damping or isolating characteristics, depending upon the type of the vibrations applied thereto, by placing the switch valve 76 selectively in the first or second position in accordance with the current operating condition of the vehicle. Thus, the instant engine mount is capable of providing excellent vibration damping/isolating effects for the engine idling vibrations applied when the vehicle is at a stop, and for the low-frequency vibrations such as engine shake or bounce and high-frequency vibrations such as booming noise which take place while the vehicle is running, assuring a remarkably improved driving comfort of the vehicle.

Further, the vibration damping and/or isolating characteristics of the instant engine mount can be changed simply by operating the switch valve 76 so as to change the pressure in the vacuum-receiving chamber 68. Therefore, the engine mount of the present invention does not require an actuator and other components to be incorporated in its structure, for providing different operating characteristics. Thus, the present engine mount is comparatively simple in construction and compact in size.

In the instant engine mount, the vacuum-receiving chamber 68 is partially defined by the elastic restriction plate 46 which is adapted to elastically deform so as to absorb the pressure changes of the fluid in the pressure-receiving chamber 44. In this arrangement, the restriction plate 46 effectively performs its pressure absorbing function only when the second diaphragm 62 is drawn onto the plate 46 so that the vacuum-receiving chamber 68 is substantially eliminated. This means that the pressure of the pressure-receiving chamber 44 is not absorbed by the restriction plate 46 when the vacuum-receiving chamber 68 is exposed to the atmosphere upon application of the engine idling vibrations. Accordingly, a sufficiently large amount of the fluid is caused to flow through the second orifice passage 74 so that the engine mount provides an intended isolating effect for the idling vibrations with high efficiency and stability.

Moreover, the instant engine mount does not incorporate the switch valve, actuator and other components in its structure, whereby sufficient space is ensured for provision of the elastic restriction plate 46. Therefore, the engine mount having the restriction plate 46 may be compact in size, and still exhibits a sufficiently reduced dynamic spring constant with respect to the high-frequency vibrations.

While the present invention has been described in its presently preferred embodiments with a certain degree of particularity, for illustrative purpose only, it is to be understood that the invention is not limited to the details of the illustrated embodiments, but may be embodied otherwise.

For example, the constructions and shapes of the first and second orifice passages are by no means limited to those of the illustrated embodiment, but may be suitably modified depending upon the required vibration damping or isolating characteristics of the elastic mount.

While the first and second orifice passages are formed separately from each other in the illustrated embodiment, these orifice passages may be connected in series with each other.

In the illustrated embodiment, the first equilibrium chamber 50 is partially defined by the elastic restriction plate 46 which is disposed to partially define the vacuum-receiving chamber 68. However, the elastic restriction plate may be positioned so as not to partially define the first equilibrium chamber.

Further, the elastic restriction plate may be prepared from a composite rubber member to which a sailcloth and the like is secured to restrict the elastic deformation of the rubber member.

While the illustrated embodiment of the invention is used as an engine mount for a motor vehicle, the principle of the present invention is equally applicable to any fluid-filled elastic mounts other than the engine mount, for example, to a vehicle body mount and a differential gear mount for the vehicle.

It is to be understood that the present invention may be embodied with various other changes, modifications and improvements, which may occur to those skilled in the art, without departing from the scope of the invention defined in the following claims.

What is claimed is:

1. A fluid-filled elastic mount for flexibly connecting two members, comprising:

a first support member and a second support member which are respectively fixed to the two members to be flexibly connected, and which are spaced apart form each other in a load-receiving direction in which vibrations are applied to the elastic mount;

an elastic body interposed between said first and second support members for elastically connecting the first and second support members;

said elastic body at least partially defining a pressure-receiving chamber which is filled with a non-compressible fluid, a pressure of said fluid in said pressure-receiving chamber changing due to elastic deformation of said elastic body upon application of the vibrations in said load-receiving direction;

a first flexible diaphragm partially defining a first equilibrium chamber filled with said non-compressible fluid, said first flexible diaphragm being elastically deformable so as to permit a volumetric change of said first equilibrium chamber to absorb a pressure change of said fluid in said first equilibrium chamber;

means for defining a first orifice passage which communicates with said pressure-receiving chamber and said first equilibrium chamber so as to permit flow of said fluid therebetween;

a second flexible diaphragm partially defining a second equilibrium chamber filled with said non-compressible fluid, said second flexible diaphragm being elastically deformable so as to permit a volumetric change of said second equilibrium chamber to absorb a pressure change of said fluid in said second equilibrium chamber;

a fixed partition plate separating said pressure-receiving chamber and said second equilibrium chamber;

means for defining a second orifice passage through said fixed partition plate so as to permit flow of said fluid between said pressure-receiving chamber and said second equilibrium chamber, said second orifice passage having a ratio of a cross sectional area thereof to a length thereof, which ratio is higher than that of said first orifice passage;

a movable elastic restriction member which is opposed to said second flexible diaphragm to at least partially define an air-tight vacuum-receiving chamber, such that said second equilibrium chamber is separated from said vacuum-receiving chamber only by said second flexible diaphragm, said vacuum-receiving chamber permitting elastic deformation of said second flexible diaphragm; and pressure control means for selectively applying a vacuum pressure to said vacuum-receiving chamber to draw said second flexible diaphragm onto said elastic restriction member, so as to restrict free deformation of said second flexible diaphragm and permit oscillation of the second flexible diaphragm with said elastic restriction member.

2. A fluid-filled elastic mount according to claim 1, wherein said means for defining a first orifice passage and said means for defining a second orifice passage comprise a partition structure, including said fixed partition plate, supported by said second support member, said pressure-receiving chamber being formed on one of opposite sides of said partition structure on the side of said first support member, said partition structure cooperating with said second support member to define an enclosed space on the other side of the partition structure.

3. A fluid-filled elastic mount according to claim 2, wherein said elastic restriction member is supported by said partition structure to divide said enclosed space into a first section formed between said elastic restriction member and said second support member, and a second section formed between said elastic restriction member and said partition structure, said first section being divided by s id first flexible diaphragm into said first equilibrium chamber and an air chamber, said second section being divided by said second flexible diaphragm into said second equilibrium chamber and said vacuum-receiving chamber.

4. A fluid-filled elastic mount according to claim 3, wherein said elastic restriction member is a disc-like rubber membrane which is secured at an outer circumferential surface to said partition structure.

5. A fluid-filled elastic mount according to claim 3, further comprising a rigid stopper member supported by said partition structure and partially defining said first equilibrium chamber, said stopper member being opposed to said elastic restriction member, for restricting elastic deformation of said elastic restriction member.

6. A fluid-filled elastic mount according to claim 3, wherein said partition structure defines an air passage communicating with said vacuum-receiving chamber, said pressure control means comprising an air conduit connected to said air passage for applying said vacuum pressure to said vacuum-receiving chamber.

7. A fluid-filled elastic mount according to claim 1, wherein said pressure control means comprises switching means which is operable between a first position for applying a pressure not lower than an atmospheric pressure to said vacuum-receiving chamber, and a second position for applying said vacuum pressure to said vacuum-receiving chamber, said non-compressible fluid flowing substantially exclusively through said second orifice passage when said switching means is placed in said first position, and through said first orifice passage when said switching means is placed in said second position.

8. A fluid-filled elastic mount according to claim 7, wherein said pressure control means further comprises a vacuum pressure source for supplying said vacuum-receiving chamber with said vacuum pressure when said switching means is placed in said second position, said vacuum-receiving chamber being held in communication with the atmosphere having the atmospheric pressure when said switching means is placed in said first position.

9. A fluid-filled elastic mount according to claim 1, wherein said pressure control means is connected to an intake pipe of an engine of a motor vehicle as a source of said vacuum pressure to be applied to said vacuum-receiving chamber.

* * * * *